United States Patent
Topchy et al.

(10) Patent No.: US 11,755,642 B2
(45) Date of Patent: *Sep. 12, 2023

(54) DETECTING MEDIA WATERMARKS IN MAGNETIC FIELD DATA

(71) Applicant: The Nielsen Company (US), LLC, New York, NY (US)

(72) Inventors: Alexander Topchy, New Port Richey, FL (US); Venugopal Srinivasan, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,792

(22) Filed: Jul. 25, 2022

(65) Prior Publication Data

US 2023/0053140 A1 Feb. 16, 2023

Related U.S. Application Data

(63) Continuation of application No. 17/011,769, filed on Sep. 3, 2020, now Pat. No. 11,423,079, which is a continuation of application No. 16/417,131, filed on May 20, 2019, now Pat. No. 10,769,206, which is a continuation of application No. 15/608,675, filed on May 30, 2017, now Pat. No. 10,318,580, which is a
(Continued)

(51) Int. Cl.
  *G06F 17/00* (2019.01)
  *G06F 16/683* (2019.01)
  *G10L 19/018* (2013.01)
  *G11B 20/00* (2006.01)

(52) U.S. Cl.
  CPC .......... *G06F 16/683* (2019.01); *G10L 19/018* (2013.01); *G11B 20/00086* (2013.01)

(58) Field of Classification Search
  CPC ................. G06F 16/683; G10L 19/018; G11B 20/00086
  USPC ........................................... 369/13.5; 700/94
  See application file for complete search history.

(56) References Cited

U.S. PATENT DOCUMENTS

| | | |
|---|---|---|
| 4,038,596 A | 7/1977 | Lee |
| 5,319,735 A | 6/1994 | Preuss et al. |
| 5,365,586 A | 11/1994 | Indeck et al. |

(Continued)

FOREIGN PATENT DOCUMENTS

WO 2008091697 7/2008

OTHER PUBLICATIONS

AGB Nielsen Media Research, "TVM5," from file dated Apr. 23, 2007 (2 pages).
(Continued)

*Primary Examiner* — Paul C McCord

(57) ABSTRACT

Methods, apparatus, systems and articles of manufacture (e.g., physical storage media) to detect media watermarks in magnetic field data are disclosed herein. Example media monitors disclosed herein include a magnetic field estimator to determine first magnetic field data, the magnetic field estimator in communication with a magnetometer. Disclosed example media monitors also include a correlator to correlate the first magnitude field data with a reference sequence to determine second magnetic field data. Disclosed example media monitors further include a watermark decoder to process the second magnetic field data to detect an audio watermark encoded in an audio signal.

20 Claims, 10 Drawing Sheets

Related U.S. Application Data continuation of application No. 14/133,069, filed on Dec. 18, 2013, now Pat. No. 9,679,053.

(60) Provisional application No. 61/825,495, filed on May 20, 2013.

(56) References Cited

U.S. PATENT DOCUMENTS

| | | |
|---|---|---|
| 5,481,294 A | 1/1996 | Thomas et al. |
| 5,819,155 A | 10/1998 | Worthy et al. |
| 5,889,548 A | 3/1999 | Chan |
| 6,112,053 A | 8/2000 | Dunki-Jacobs et al. |
| 6,149,656 A | 11/2000 | Walz et al. |
| 6,205,227 B1 | 3/2001 | Mahoney et al. |
| 6,519,769 B1 | 2/2003 | Hopple et al. |
| 6,671,376 B1 | 12/2003 | Koto et al. |
| 6,724,184 B1 | 4/2004 | Marx et al. |
| 7,222,071 B2 | 5/2007 | Neuhauser et al. |
| 7,908,133 B2 | 3/2011 | Neuhauser |
| 8,103,049 B2 | 1/2012 | Petrovic et al. |
| 8,175,617 B2 | 5/2012 | Rodriguez |
| 8,260,828 B2 | 9/2012 | Dijk et al. |
| 8,359,205 B2 | 1/2013 | Srinivasan |
| 8,369,972 B2 | 2/2013 | Topchy et al. |
| 9,027,048 B2 | 5/2015 | Jones et al. |
| 9,178,369 B2 | 11/2015 | Partovi |
| 9,183,552 B2 | 11/2015 | Kauniskangas et al. |
| 9,189,783 B2 | 11/2015 | Chowdhury et al. |
| 9,679,053 B2 | 6/2017 | Topchy et al. |
| 10,318,580 B2 | 6/2019 | Topchy et al. |
| 10,769,206 B2 | 9/2020 | Topchy et al. |
| 11,423,079 B2 | 8/2022 | Topchy et al. |
| 2002/0168069 A1 | 11/2002 | Tehranchi et al. |
| 2003/0231785 A1 | 12/2003 | Rhoads et al. |
| 2004/0024588 A1 | 2/2004 | Waton et al. |
| 2004/0263911 A1 | 12/2004 | Rodriguez et al. |
| 2005/0198505 A1 | 9/2005 | Smith |
| 2006/0203105 A1 | 9/2006 | Srinivasan |
| 2008/0079573 A1 | 4/2008 | Bloebaum et al. |
| 2009/0150217 A1 | 6/2009 | Luff |
| 2009/0171767 A1 | 7/2009 | Kolessar |
| 2010/0057231 A1 | 3/2010 | Slater et al. |
| 2010/0223062 A1 | 9/2010 | Srinivasan et al. |
| 2010/0316232 A1 | 12/2010 | Acero et al. |
| 2011/0093878 A1 | 4/2011 | Falcon |
| 2011/0098056 A1 | 4/2011 | Rhoads et al. |
| 2011/0159921 A1 | 6/2011 | Davis et al. |
| 2011/0184580 A1 | 7/2011 | Kawamoto et al. |
| 2011/0208515 A1 | 8/2011 | Neuhauser |
| 2011/0276157 A1 | 11/2011 | Wang et al. |
| 2011/0276333 A1 | 11/2011 | Wang et al. |
| 2012/0076344 A1 | 3/2012 | Reed |
| 2012/0084131 A1 | 4/2012 | Bergel et al. |
| 2012/0203363 A1 | 4/2012 | McKenna et al. |
| 2012/0220311 A1 | 8/2012 | Rodriguez et al. |
| 2012/0226691 A1 | 9/2012 | Edwards |
| 2012/0277893 A1 | 11/2012 | Davis et al. |
| 2013/0009907 A1 | 1/2013 | Rosenberg et al. |
| 2013/0019292 A1 | 1/2013 | Varshavsky et al. |
| 2013/0024018 A1 | 1/2013 | Chang et al. |
| 2013/0054603 A1 | 2/2013 | Birdwell et al. |
| 2013/0080571 A1 | 3/2013 | Kirkeby |
| 2013/0119928 A1 | 5/2013 | Partovi |
| 2013/0211662 A1 | 8/2013 | Blumer et al. |
| 2013/0273941 A1 | 10/2013 | Grokop |
| 2013/0314214 A1 | 11/2013 | Leica et al. |
| 2014/0108020 A1 | 4/2014 | Sharma et al. |
| 2014/0172435 A1 | 6/2014 | Thiergart et al. |
| 2014/0258132 A1 | 9/2014 | Swamy et al. |
| 2014/0324199 A1 | 10/2014 | Gu et al. |
| 2015/0043768 A1 | 2/2015 | Breebaart |
| 2015/0084900 A1 | 3/2015 | Hodges et al. |
| 2015/0100463 A1 | 4/2015 | Drazin |
| 2015/0201294 A1 | 7/2015 | Risberg et al. |
| 2016/0021238 A1 | 1/2016 | Abramson et al. |
| 2016/0086198 A1 | 3/2016 | Bell et al. |
| 2017/0262536 A1 | 9/2017 | Topchy et al. |
| 2019/0272287 A1 | 9/2019 | Topchy et al. |

OTHER PUBLICATIONS

United States Patent and Trademark Office, "Non-final Office Action," mailed in connection with U.S. Appl. No. 14/133,069, dated Sep. 25, 2015 (13 pages).

United States Patent and Trademark Office, "Final Office Action," mailed in connection with U.S. Appl. No. 14/133,069, dated Apr. 19, 2016 (15 pages).

United States Patent and Trademark Office, "Non-final Office Action," mailed in connection with U.S. Appl. No. 14/133,069, dated Sep. 28, 2016 (11 pages).

United States Patent and Trademark Office, "Notice of Allowance," mailed in connection with U.S. Appl. No. 14/133,069, dated Feb. 10, 2017 (5 pages).

Dolby, "Dolby Model 363 Two-Channel Unit," 1988 (17 pages).

United States Patent and Trademark Office, "Notice of Allowance," mailed in connection with U.S. Appl. No. 15/608,675, dated Jan. 31, 2019 (5 pages).

United States Patent and Trademark Office, "Non-final Office Action," mailed in connection with U.S. Appl. No. 15/608,675, dated Oct. 3, 2018 (11 pages).

United States Patent and Trademark Office, "Notice of Allowance," mailed in connection with U.S. Appl. No. 16/417,131, dated May 1, 2020 (8 pages).

United States Patent and Trademark Office, "Non-final Office Action," mailed in connection with U.S. Appl. No. 16/417,131, dated Dec. 20, 2019 (6 pages).

United States Patent and Trademark Office, "Notice of Allowance," mailed in connection with U.S. Appl. No. 17/011,769, dated Apr. 13, 2022 (8 pages).

United States Patent and Trademark Office, "Non-Final Office Action," mailed in connection with U.S. Appl. No. 17/011,769, dated Sep. 13, 2021 (11 pages).

DETECTING MEDIA WATERMARKS IN MAGNETIC FIELD DATA

RELATED APPLICATION(S)

This patent arises from a continuation of U.S. patent application Ser. No. 17/011,769 (now U.S. Pat. No. 11,423,079), which is titled "DETECTING MEDIA WATERMARKS IN MAGNETIC FIELD DATA," and which was filed on Sep. 3, 2020, which is a continuation of U.S. patent application Ser. No. 16/417,131 (now U.S. Pat. No. 10,769,206), which is titled "DETECTING MEDIA WATERMARKS IN MAGNETIC FIELD DATA," and which was filed on May 20, 2019, which is a continuation of U.S. patent application Ser. No. 15/608,675 (now U.S. Pat. No. 10,318,580), which is titled "DETECTING MEDIA WATERMARKS IN MAGNETIC FIELD DATA," and which was filed on May 30, 2017, which is a continuation of U.S. patent application Ser. No. 14/133,069 (now U.S. Pat. No. 9,679,053), which is titled "DETECTING MEDIA WATERMARKS IN MAGNETIC FIELD DATA," and which was filed on Dec. 18, 2013, which claims the benefit of U.S. Provisional Application Ser. No. 61/825,495, which is titled "AUDIO WATERMARK DETECTION WITH SMARTPHONE" and which was filed on May 20, 2013. U.S. Provisional Application Ser. No. 61/825,495, U.S. patent application Ser. No. 14/133,069, U.S. patent application Ser. No. 15/608,675, and U.S. patent application Ser. No. 16/417,131 are hereby incorporated by reference in their respective entireties. Priority to U.S. Provisional Application Ser. No. 61/825,495, U.S. patent application Ser. No. 14/133,069, U.S. patent application Ser. No. 15/608,675, U.S. patent application Ser. No. 16/417,131, and U.S. patent application Ser. No. 17/011,769 is hereby claimed.

FIELD OF THE DISCLOSURE

This disclosure relates generally to media watermarking and, more particularly, to detecting media watermarks in magnetic field data.

BACKGROUND

Watermarks can be embedded or otherwise included in media data and/or signals to enable additional information to be conveyed with the media. For example, audio watermarks can be embedded or otherwise included in the audio data/signal portion of a media stream, file and/or signal to convey data, such as media identification information, copyright protection information, etc., with the media. Such watermarks enable monitoring of the distribution and/or use of media, such as by detecting watermarks present in television broadcasts, radio broadcasts, streamed multimedia content, etc., to identify the particular media being presented to viewers, listeners, users, etc. Such information can be valuable to advertisers, content providers, and the like.

Magnetometers and other magnetic field measurement sensors have become common components included in modern portable electronic devices, such as smartphones, handset devices, tablet computers, etc. Typically, a magnetometer or similar sensing component is included in a portable device to provide magnetic field data representative of measured values of a magnetic field in the vicinity of the portable device. The portable device can then use this magnetic field data to determine a spatial orientation of the portable device. In at least some examples, other software applications executing on the portable device and/or accessories capable of interfacing with the portable device can gain access to this magnetic field data as well.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
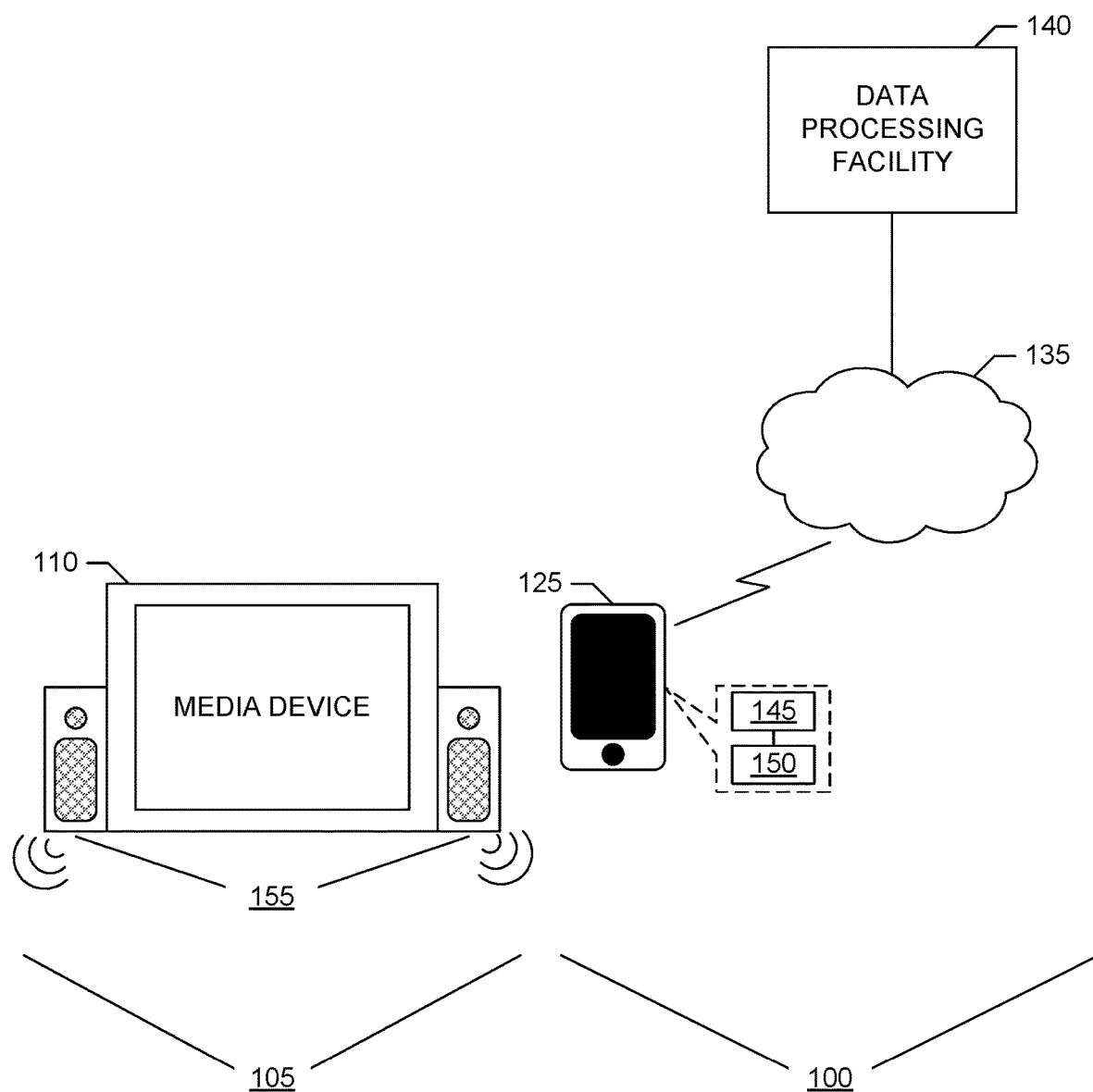
FIG. 1 is a block diagram of an example media monitoring system including an example portable device having an example media device monitor capable of detecting media watermarks in magnetic field data and positioned to detect watermarks in media presented by an example media device having a first configuration.

Methods, apparatus, systems and articles of manufacture (e.g., physical storage media) to detect media watermarks in magnetic field data are disclosed herein. Example methods disclosed herein to detect media watermarks can include accessing multidimensional magnetic field data representative of values of a magnetic field measured within a first distance of audio circuitry that is to output an audio signal corresponding to media presented by a media device. Such example methods can also include processing the multidimensional magnetic field data to detect a watermark included in the audio signal. For example, the audio circuitry can include speaker leads electrically coupling a speaker to a speaker driver circuit, and processing the multidimensional magnetic field data can include detecting variations in the magnetic field that are induced by an electrical signal being carried by the speaker leads to cause the speaker to output the audio signal.

In some such example methods, accessing the multidimensional magnetic field data can include obtaining the multidimensional magnetic field data from an interface providing access to a magnetometer of a portable device. Additionally or alternatively, in some examples, the multidimensional magnetic field data can include a plurality of directional components. In some such example methods, processing the multidimensional magnetic field data can include (1) processing the directional components to determine magnitude values representative of a magnitude of the magnetic field over time, and (2) processing the magnitude values to detect the watermark included in the audio signal.

For example, processing the magnitude values can include (1) transforming the magnitude values into a frequency domain to determine transformed magnetic field data, and (2) processing the transformed magnetic field data to detect the watermark. In some such examples, the watermark modulates a first frequency of the audio signal, the multidimensional magnetic field data is accessed at a first sampling rate less than twice the first frequency, and processing the transformed magnetic field data includes evaluating the transformed magnetic field data at a second frequency, different from the first frequency, to detect the watermark. In such examples, the second frequency is selected to compensate for aliasing caused by accessing the multidimensional magnetic field data at the first sampling rate. Additionally or alternatively, in some such examples, the audio circuitry drives a speaker that is to emit the audio signal, the watermark is included in a first frequency range of the audio signal that is below a threshold of frequencies capable of being emitted by the speaker, and processing the transformed magnetic field data includes evaluating a portion of the transformed magnetic field data corresponding to the first frequency range to detect the watermark.

In other examples, the multidimensional magnetic field data is first magnetic field data, and processing the magnitude values includes (1) correlating the magnitude values with a reference sequence to determine second magnetic field data, and (2) processing the second magnetic field data to detect the watermark.

These and other example methods, apparatus, systems and articles of manufacture (e.g., physical storage media) to detect media watermarks in magnetic field data are disclosed in further detail below.

Example methods, apparatus, systems and articles of manufacture (e.g., physical storage media) to detect media watermarks in magnetic field data as disclosed herein enable detection of an informational signal, such a watermark, which is embedded or otherwise included in a host audio signal to be emitted by one or more speaker(s), using an orientation sensor, such as a magnetometer or other magnetic sensor, included in a metering device. For example, such metering devices can be implemented by smartphones, handset devices, tablet computers, etc., because orientation sensors, such as magnetometers, are often present in those types of consumer devices. In other examples, dedicated platforms containing one or more orientation sensors, such as magnetometers, can be used to implement metering devices capable of detecting media watermarks in magnetic field data as disclosed herein.

Detecting media watermarks in magnetic field data, as disclosed herein, can provide benefits over prior watermark detection techniques. For example, because magnetic field data is used to detect one or more watermark(s) embedded in an audio signal, the example methods, apparatus, systems and articles of manufacture (e.g., physical storage media) disclosed herein do not require direct or even indirect access to the audio signal containing the watermark. This can be especially beneficial when monitoring media being presented by a media device that prevents (e.g., via digital rights management techniques) external access to the media data being presented by the media device.

Furthermore, watermark detection using magnetic field data, as disclosed herein, permits detection of watermark data embedded in an audio signal at frequencies below a frequency threshold supported by the speaker(s) of the media device. For example, due to the physical characteristics of the diaphragms in the speaker(s) of the media device, the speaker(s) may have a frequency response range bounded by a lower limit or threshold such that audio frequencies below that threshold are unable to be rendered by the speaker(s). If a watermark is embedded in a frequency range below such a threshold, prior watermark detection techniques that rely on processing audio data collected via a microphone will be unable to detect the watermark in the audio emitted from the speaker(s). However, such a watermark may still cause magnetic field variations when the audio signal is applied as an electrical current to the speaker leads and/or other audio circuitry driving the speaker(s). Accordingly, watermark detection using magnetic field data, as disclosed herein, may be able to detect watermarks in scenarios where prior watermark detection techniques based on processing sensed audio data would fail.

Turning to the figures, a block diagram of an example media monitoring system 100 employing detection of media watermarks in magnetic field data as disclosed herein is illustrated in FIG. 1. The example media monitoring system 100 supports monitoring of media presented at one or more monitored sites, such as an example monitored site 105 illustrated in FIG. 1. The monitored site 105 includes an example media device 110, which is also referred to herein as a media presentation device 110. Although the example of FIG. 1 illustrates one monitored site 105 and one media device 110, media monitoring based on detection of media watermarks in magnetic field data as disclosed herein can be used in media monitoring systems 100 supporting any number of monitored sites 105 having any number of media devices 110.

The media monitoring system 100 of the illustrated example includes an example media device meter 125, also referred to as a meter 125, a site meter 125, a site unit 125, a home unit 125, a portable device 125, etc., to monitor media presented by the media device 110. In the illustrated example, the media monitored by the media device meter 125 can correspond to any type of media presentable by the media device 110. For example, monitored media can correspond to media content, such a television programs, radio programs, movies, etc., as well as commercials, advertisements, etc. In the illustrated example, the media device meter 125 determines metering data that may identify and/or be used to identify media presented by the media device (and, thus, infer media exposure) at the monitored site 105. The media device meter 125 then stores and reports this metering data via an example network 135 to an example data processing facility 140. The data processing facility 140 performs any appropriate post-processing of the metering data to, for example, determine audience ratings information, identify targeted advertising to be provided to the monitored site 105, etc. In the illustrated example, the network 135 can correspond to any type(s) and/or number of wired and/or wireless data networks, or any combination thereof.

In the illustrated example, the media device 110 monitored by the media device meter 125 can correspond to any type of audio, video and/or multimedia presentation device capable of presenting media audibly and/or visually. For example, the media device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As other examples, the media device 110 can correspond to a multimedia computer system, a personal digital assistant, a cellular/mobile smartphone, a radio, a tablet computer, etc.

In the media monitoring system 100 of the illustrated example, the media device meter 125 and the data processing facility 140 cooperate to perform media monitoring based on detecting media watermarks. Moreover, the media device meter 125 is able to detect media watermarks in magnetic field data as disclosed herein. Examples of watermarks include identification codes, ancillary codes, etc., that may be transmitted within media signals. For example, identification codes can be transmitted as watermarked data embedded or otherwise included with media (e.g., inserted into the audio, video, or metadata stream of media) to uniquely identify broadcasters and/or media (e.g., content or advertisements). Watermarks can additionally or alternatively be used to carry other types of data, such as copyright protection information, secondary data (e.g., such as one or more hyperlinks pointing to secondary media retrievable via the Internet and associated with the primary media carrying the watermark), commands to control one or more devices, etc. Watermarks are typically extracted using a decoding operation.

In contrast, signatures are a representation of some characteristic of the media signal (e.g., a characteristic of the frequency spectrum of the signal). Signatures can be thought of as fingerprints. They are typically not dependent upon insertion of data in the media, but instead preferably reflect an inherent characteristic of the media and/or the signal transporting the media. Systems to utilize codes and/or signatures for audience measurement are long known. See, for example, U.S. Pat. No. 5,481,294 to Thomas et al., which is hereby incorporated by reference in its entirety.

In the illustrated example of FIG. 1, the media device meter 125 is implemented by a portable device 125 including an example magnetometer 145 or any other type(s) and/or number of orientation sensor(s) 145 (e.g., such as one or more magnetic sensors, electronic compasses, etc.) capable of measuring a magnetic field in the vicinity of the portable device 125. As such, the portable device 125 can correspond to any type of portable device having magnetic field sensing capabilities, such as, but not limited to, a smartphone, a tablet computer, a handheld device, etc. In some examples, the media device meter 125 can be implemented by a metering device intended to be relatively stationary, but including the example magnetometer 145 or other orientation sensor(s) 145. Furthermore, in some examples, the media device meter 125 can be implemented by or otherwise included in the media device 110, such as when the media device 110 corresponds to a portable device (e.g., a smartphone, a tablet computer, a handheld device, etc.) capable of presenting media and also including the example magnetometer 145 or other orientation sensor(s) 145. (This latter implementation can be especially useful in example scenarios in which a media monitoring application is executed on the media device 110 itself, but the media device 110 prevents, e.g., via digital rights management or other techniques, third-party applications, such as the media monitoring application, from accessing protected media data stored on the media device 110.) For convenience, and without loss of generality, the term magnetometer is used herein to refer to any type of magnetic field sensing element (e.g., such as a magnetic sensor, an orientation sensor, an electronic compass, etc.).

Magnetometers, such as the example magnetometer 145 of FIG. 1, are often included as components in modern portable devices (e.g., smartphones, handset devices, tablet computers, etc.), such as the portable device 125. A magnetometer, such as the magnetometer 145, is a device that provides magnetic field vector measurements or, more generally, multidimensional magnetic field data representative of a magnetic field in the vicinity of the magnetometer (and, by extension, in the vicinity of the device including the magnetometer). In some examples, the magnetic field data obtained from the magnetometer 145 is multidimensional magnetic field data that includes multiple directional components representative of the strength and/or some other value of the magnetic field in multiple directions, such as two (2) orthogonal directions referred to herein as the x and y directions, three (3) orthogonal directions referred to herein as the x, y and z directions, etc. Typically, the portable device includes functionality to process the magnetic field data provided by the magnetometer to determine the spatial orientation of the portable device. For example, software development kits (SDKs) for Apple® iOS®, Android™, Windows®, and Blackberry® smartphones include application interfaces (APIs) defined to enable applications executing on the smartphones to access the magnetometer and obtain the magnetic field data representative of the values of, for example, the x, y and z directional components of the magnetic field in the vicinity of the smartphone. Typical prior applications then process the obtained magnetic field data to determine an orientation of the smartphone.

In addition to or as an alternative to including functionality capable of determining device orientation from magnetic field data obtained from the magnetometer 145, the portable device 125 of the illustrated example also includes an example media device monitor 150 to detect watermark(s) in the magnetic field data obtained from the magnetometer 145. For example, a watermark that is detectable in the magnetic field data may originate from an audio signal that is to be emitted by example speaker(s) 155 of the media device 110. In such examples, the media device 110 may generate a varying electrical current corresponding to the audio signal in audio circuitry (e.g., speaker leads and a speaker driver circuit) driving the speaker(s) 155. This varying electric current can induces a varying magnetic field in the audio circuitry (e.g., speaker leads and a speaker driver circuit), which may be sensed by the magnetometer 145 when the portable device 125 placed within a first distance (e.g., adjacent to or within a few inches, feet or some other distance) of the speaker(s) 155 of the media device 110. In some examples, the media device monitor 150 detects the watermark(s) included in the audio signal to be emitted by example speaker(s) 155 by detecting variations caused by the watermark(s) in the magnetic field data obtained from the magnetometer 145. An example implementation of the media device monitor 150 is illustrated in FIG. 3, which is described in further detail below.

Figure 2:
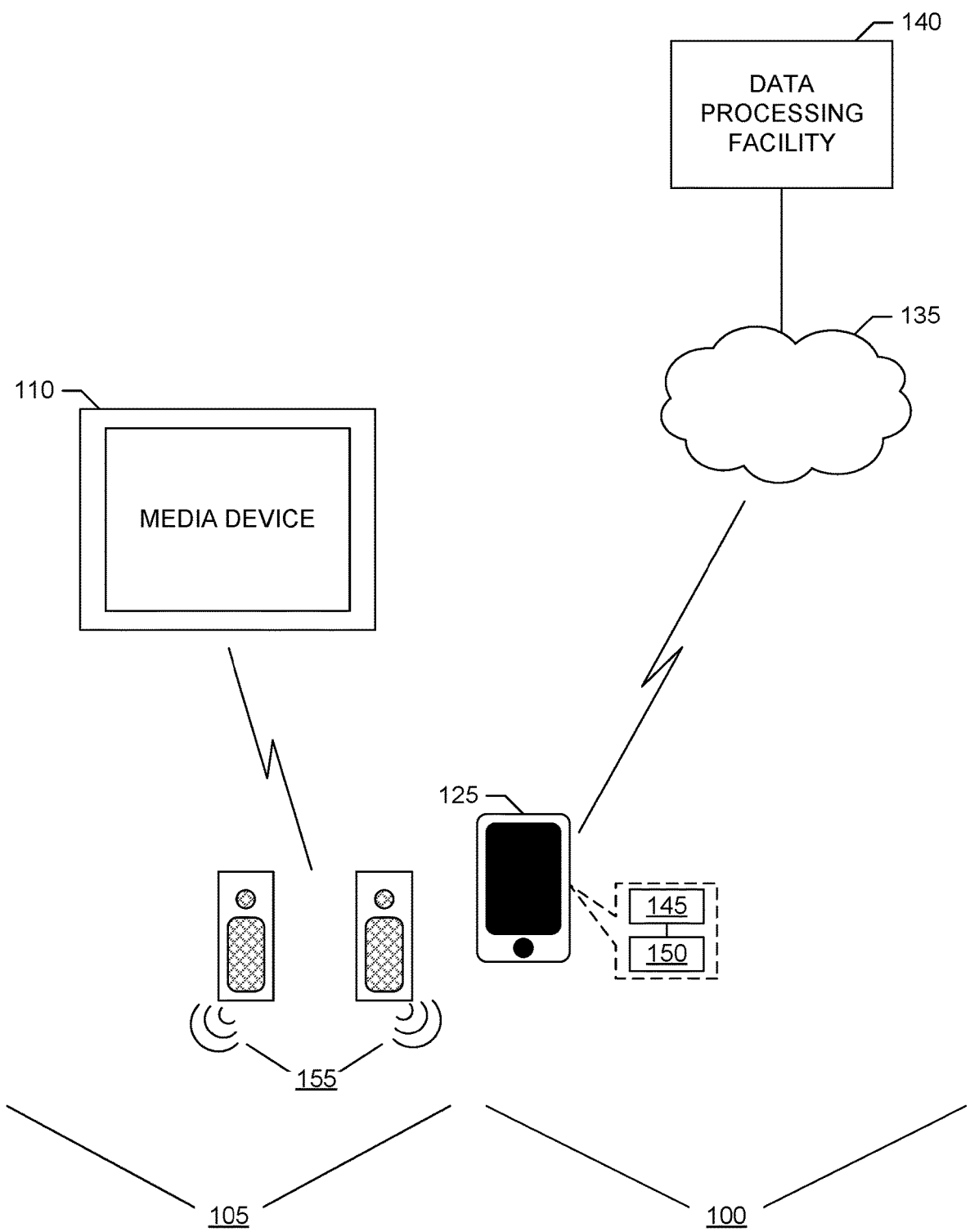
FIG. 2 is a block diagram of the example media monitoring system of FIG. 1 but with the example portable device positioned to detect watermarks in media presented by an example media device having a second configuration.

In the illustrated example of FIG. 1, the portable device 125, which is to monitor media presented by the media device 110, is positioned within a first distance (e.g., adjacent to or within a few inches, feet or some other distance) of the media device 110 to be able to sense magnetic field variations induced by the audio circuitry driving the speaker(s) 155 of the media device. However, in some examples, the speaker(s) 155 are positioned away from the media device 110, such as when the speaker(s) 155 correspond to any type(s) and/or number of wireless speaker(s) 155. Accordingly, FIG. 2 illustrates a second example configuration of the media monitoring system 100 in which the portable device 125 is positioned within a first distance (e.g., adjacent to or within a few inches, feet or some other distance) of the example speaker(s) 155 (which are wireless speaker(s) in the illustrated example) but a farther distance away from the media device 110, to be able to sense magnetic field variations induced by the audio circuitry in the speaker(s) 155.

In some examples, to aid in the proper positioning of the portable device 125, the media device monitor 150 causes the portable device 125 to indicate whether the portable device 125 has been positioned within the first distance of the media device 110 and/or the speakers 155 and is able to detect watermarks using magnetic field data. For example, the media device monitor 150 may cause an output indicator, such as a light, a tone, a symbol on a display of the portable device 125, etc., to be asserted when the media device monitor 150 determines that valid watermarks are being detected (e.g., based on cyclical redundancy check (CRC) bits or other validation data included in the detected watermark). Outputting such an indicator can provide feedback to an operator of the portable device 125, which notifies the operator when the portable device 125 has been placed within a first distance of the media device 110 and/or the speakers 155 suitable for accurately detecting watermarks.

Figure 3:
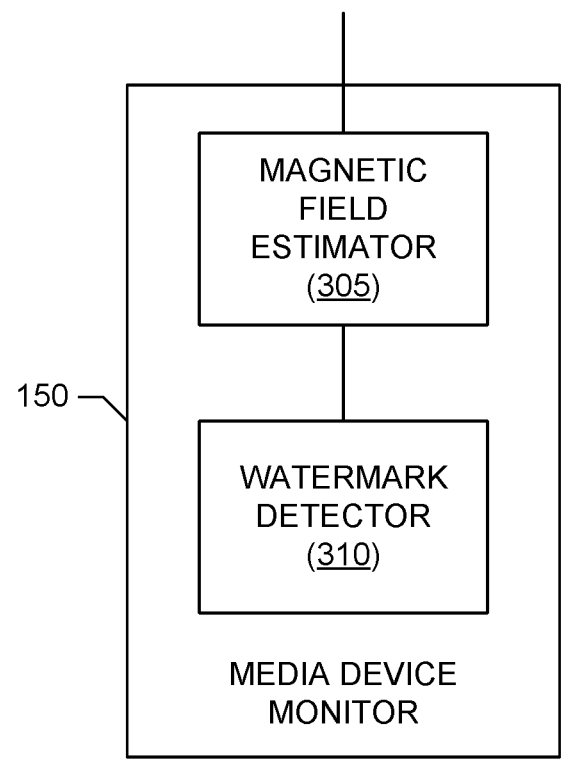
FIG. 3 is a block diagram of an example implementation of the media device monitor of FIGS. 1 and/or 2.

An example implementation of the media device monitor 150 of FIGS. 1 and/or 2, which may be included in or otherwise implemented by the media device meter 125 (e.g., which may be a portable device 125), is illustrated in FIG. 3. The example media device monitor 150 of FIG. 3 includes an example magnetic field estimator 305 to estimate values of a magnetic field in the vicinity of the media device meter 125 using magnetic field data obtained from the example magnetometer 145. In some examples, the magnetic field estimator 305 accesses magnetic field data determined by the magnetometer 145 using one or more APIs, as described above. For example, the media device meter 125 (e.g., which may be a portable device 125) may provide an API or other function call for reading the magnetic field data returned by the magnetometer 145 at a given sampling rate, such as a sampling rate of 40 Hz or some other rate. The sampling rate for obtaining magnetic field data is determined by, for example, the time involved in measuring the magnetic field with the magnetometer 145 (e.g., which may be approximately 15 ms. or some other interval of time). In some examples, the sampling rate for obtaining magnetic field data is additionally or alternatively determined by an automatic power-down period configured to occur after each magnetic field measurement performed by the magnetometer 145. The sampling rate for obtaining magnetic field data can also be limited by other latencies in the operating system (OS) of the media device meter 125 (which may be a portable device 125). For example, the sampling interval (Ts) and, thus, the sampling rate (Fs=1/Ts) for obtaining magnetic data may be equal to the sum of one or more of the foregoing time intervals, such as given by the expression in Equation 1, which is:

$$Fs = \frac{1}{Ts} = \frac{1}{T_{measurement} + T_{power-down} + T_{latencies}} \quad \text{Equation 1}$$

where $T_{measurement}$ represents the magnetic field measurement interval, $T_{power-down}$ represents the power down interval, and $T_{latencies}$ represents the latency interval.

Although possible sampling rates may increase in the future due to improvements in sensor technology and device drivers (e.g., which may allow for higher bandwidth communications), even fairly low sampling rates for obtaining magnetic field data from the magnetometer 145 can permit data communication at multiple bits per second, depending on signal modulation scheme, signal level, ambient noise level, etc. For example, noise in the magnetic field values returned by the magnetometer 145 can be caused by the Earth's magnetic field, other electronic equipment in the vicinity of the media device meter 125, motion of the media device meter 125, etc. For example, the magnetic field values returned by the magnetometer 145 can be a function of multiple components, such as given by the expression in Equation 2, which is:

$$M_{measured} = M_{audio\ circuit} + M_{Earth} + M_{other} \quad \text{Equation 2}$$

where $M_{audio\ circuit}$ represents the magnetic field induced by the audio circuitry of the media device 110 (and which may contain the watermark(s) to be detected), $M_{Earth}$ represents the magnetic field of the Earth, and $M_{other}$ represents magnetic field(s) induced by other electronic equipment in the area, as well as any other sources of magnetic field distortions, noise, etc.

In the illustrated example of FIG. 3, the magnetic field estimator 305 accesses magnetic field data from the magnetometer 145 at a sampling rate Fs to form a sequence of magnetic field data representative of values of a magnetic field measured over time and, presumably, within a first distance of audio circuitry that is to output an audio signal containing one or more audio watermarks to be detected. In some examples, the magnetic field data obtained by the magnetic field estimator 305 contains multiple directional components representative of the strength and/or some other measurement quantity of the magnetic field in multiple directions, such as the orthogonal x, y and/or z directional components mentioned above. In some such examples, the magnetic field estimator 305 processes the directional components to determine magnitude values representative of a magnitude of the magnetic field over time. For example, if the magnetic field data contains two directional components, the magnetic field estimator 305 can determine the determine magnitude values for the magnetic field according to Equation 3, which is:

$$|\vec{B}(t)| = \sqrt{B_x^2(t) + B_y^2(t)} \quad \text{Equation 3}$$

In Equation 3, $|\vec{B}(t)|$ represents the magnitude value of the magnetic field vector $\vec{B}(t) = (B_x(t), B_y(t))$ at sample time t, $B_x(t)$ represents the x-directional magnetic field component at sample time t, and $B_y(t)$ represents the y-directional magnetic field component at sample time t. As another example, if the magnetic field data contains three directional components, the magnetic field estimator 305 can determine the determine magnitude values for the magnetic field according to Equation 4, which is:

$$|\vec{B(t)}| = \sqrt{B_x^2(t) + B_y^2(t) + B_z^2(t)} \qquad \text{Equation 4}$$

In Equation 4, $|\vec{B(t)}|$ represents the magnitude value for the magnetic field vector $\vec{B(t)} = (B_x(t), B_y(t), B_z(t))$ at sample time t, $B_x(t)$ represents the x-directional magnetic field component at sample time t, $B_y(t)$ represents the y-directional magnetic field component at sample time t, and $B_z(t)$ represents the z-directional magnetic field component at sample time t.

The example media device monitor 150 of FIG. 3 also includes an example watermark detector 310 to process the magnetic field data obtained by the magnetic field estimator 305 detect one or more watermarks included (e.g., induced) in the magnetic field data by an audio signal corresponding to media presented by a media device, such as the media device 110. For example, if the magnetic field estimator 305 determines magnitude values of the magnetic field data, then the watermark detector 310 may process the magnitude values of the magnetic field data to detect one or more watermarks included in the audio signal and further included in the magnetic field data due to magnetic field variations caused by audio circuitry providing the audio signal to the speaker(s) 155 of the media device 110. The particular type(s) of watermark detection algorithm(s) implemented by the watermark detector 310 will depend on the type(s) of watermark encoding algorithm(s) used to embed or otherwise include the audio watermark(s) in the audio signal. Two example implementations of the watermark detector 310, which correspond to two different families of watermark encoding algorithm(s), are illustrated in FIGS. 4 and 5, which are described in further detail below.

Figure 4:
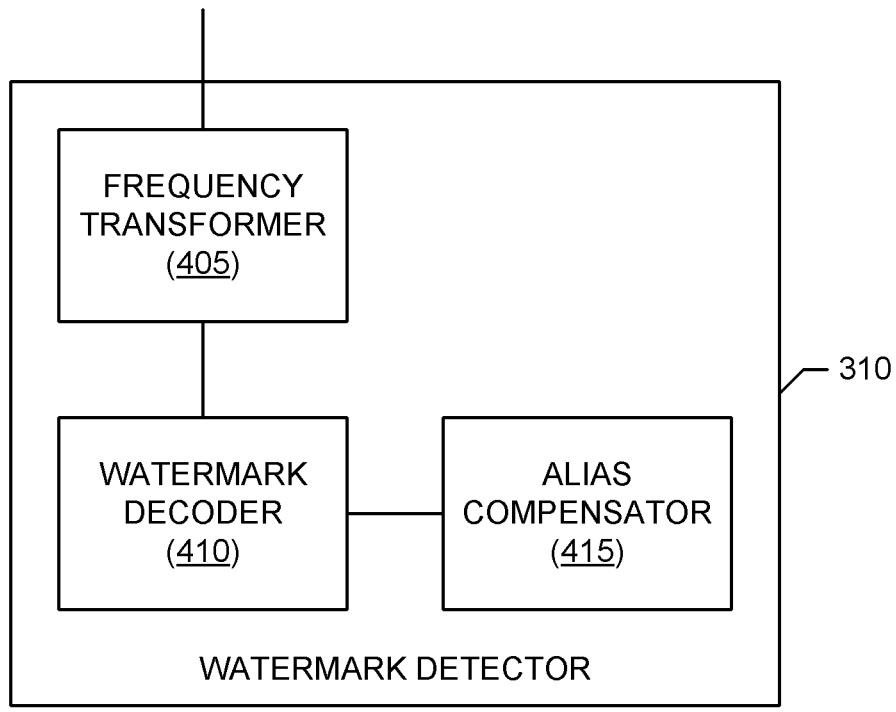
FIG. 4 is a block diagram of a first example watermark detector that may be used to implement the example media device monitor of FIGS. 1, 2 and/or 3.
Figure 5:
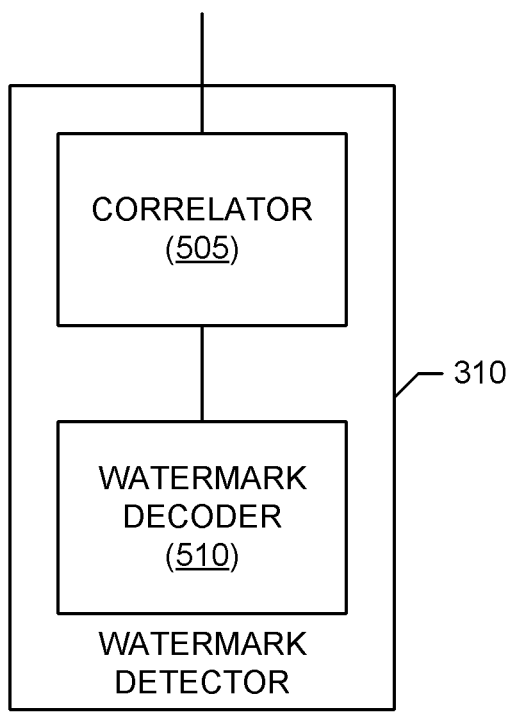
FIG. 5 is a block diagram of a second example watermark detector that may be used to implement the example media device monitor of FIGS. 1, 2 and/or 3.

A first example implementation of the watermark detector 310 of FIG. 3 is illustrated in FIG. 4. The first example implementation is tailored to detect watermarks encoded in one or more frequencies of an audio signal, or otherwise encoded in the frequency domain of the audio signal. Examples of watermarks encoded in the frequency domain of an audio signal and that can be detected using the example watermark detector 310 of FIG. 3 include, but are not limited to, examples described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, and U.S. Publication No. 2010/0223062, entitled "Methods and Apparatus to Perform Audio Watermarking and Watermark Detection and Extraction," which was published on Sep. 2, 2010, all of which are hereby incorporated by reference in their entireties. U.S. Pat. No. 8,359,205, 8,369,972 and U.S. Publication No. 2010/0223062 describe example watermarking systems in which a watermark is included in an audio signal by manipulating a set of frequencies of the audio signal.

Turning to FIG. 4, the example watermark detector 310 illustrated therein includes an example frequency transformer 405 to transform magnetic field data, such a magnitude values determined by the magnetic field estimator 305 and representative of a magnitude of a magnetic field over time, into a frequency domain to determine transformed magnetic field data. For example, the frequency transformer 405 can perform any transform operation on input magnetic field data (e.g., the input magnetic field magnitude value), such as a fast Fourier transform (FFT), a discrete Fourier transform (DFT), a discrete cosine transform (DCT), a Hadamard transform, etc., to determine the transformed magnetic field data, which represents values of the magnetic field in a frequency domain (or other transform domain, such as a wavelet domain, etc.).

The example watermark detector 310 of FIG. 4 also includes an example watermark decoder 410 to detect a watermark in the transformed magnetic field data determined by the frequency transformer 405. The watermark detection/decoding algorithm(s) implemented by the watermark decoder 410 depends on the type of encoding algorithm(s) used to encode the watermark in the audio signal. For example, the watermark decoder 410 may be configured to evaluate transformed magnetic field data at one or more frequencies and/or in one or more ranges of frequencies to detect a watermark that was included in an audio signal. For example, the watermark may be encoded in a first range of frequencies of an audio signal such that the watermark is inaudible in the watermarked audio signal. In such examples, when media device 110 applies the watermarked audio signal to the audio circuitry driving the speaker(s) 155, the watermark will induce magnetic field variations at substantially the same first range of frequencies in which the watermark was encoded. Accordingly, the watermark decoder 410 can evaluate the transformed magnetic field data in the first range of frequencies to detect the watermark.

In some examples, the watermark is added or otherwise included in the audio signal in a first frequency range being below a threshold of frequencies capable of being emitted by the speaker(s) 155 (e.g., due to physical limitations of the speaker diaphragm(s)). Because such a low frequency watermark (e.g., at or below 20-25 Hz) is not reproducible by the speaker(s) 155, the low frequency watermark will not be detectable in the audio signal when emitted by the speaker(s) 155. However, such a low frequency watermark may still be detectable in the magnetic field data obtained from the magnetometer 145 (e.g., when the media device meter 125 is positioned within a first distance of the media device 110 and/or the speaker(s) 155). Accordingly, watermark detection using magnetic field data as disclosed herein enables detection of audio watermarks wirelessly but without relying on having access to the source audio signal containing the watermark or a sensed acoustic signal containing the watermark.

The watermark detector 310 of FIG. 4 further includes an example alias compensator 415 to compensate for the sampling frequency at which the magnetic field data is obtained by the magnetic field estimator 305 from the magnetometer 145. If the sampling frequency for obtaining the magnetic field data is less than twice a frequency component of the watermark signal or, in other words, if the watermark frequency component is greater than half the sampling frequency, then that frequency component of the watermark signal may experience aliasing. In such examples, the frequency component will be aliased and the effects of that frequency component will appear at another frequency of the watermark signal. For example, assume that the sampling frequency for obtaining the magnetic field data the magnetic field data is 41 Hz (e.g., which corresponds to the media metering device 125 being able to provide 1230 magnetic field data samples in a 30 second interval). If the watermark includes a first frequency component at 32 Hz, that first frequency component will be aliased due to the sampling at 41 Hz such that the energy at the component will appear at 9 Hz. As another example, if the watermark includes a second frequency component at 45 Hz, that second frequency component will be aliased due to the sampling at 41 Hz such that the energy at the component will appear at 4 Hz. Accordingly, the alias compensator 415 of the illustrated example uses the sampling frequency for obtaining the magnetic field data to determine whether to configure the watermark decoder 410 to compensate for aliasing by evaluating the transformed magnetic field data at an aliased frequency to detect a watermark at a different original frequency.

For example, if the watermark modulates a first frequency of the audio signal, and the alias compensator 415 determines that the first frequency is greater than half the sampling rate, then the alias compensator 415 selects a second frequency (e.g., based on a difference between the sampling rate and the first frequency), which is different from the first frequency, at which the watermark decoder 410 is to evaluate the transformed magnetic field data to detect the watermark. The alias compensator 415 then configures the watermark decoder 410 accordingly. Otherwise, if the first frequency is less than or equal to half the sampling rate, the alias compensator 415 does not perform alias compensation and the watermark decoder 410 evaluates the transformed magnetic field data at the first frequency to detect the watermark.

A second example implementation of the watermark detector 310 of FIG. 3 is illustrated in FIG. 5. The second example implementation is tailored to detect watermarks encoded in one or more time domain characteristics of the audio signal, such as by modulating the amplitude and/or phase of the audio signal in the time domain. Examples of watermarks encoded in the time domain of an audio signal and that can be detected using the example watermark detector 310 of FIG. 4 include, but are not limited to, examples in which spread spectrum techniques are used to include a watermark in an audio signal. For example, such a watermark can be encoded in the audio signal by (1) spreading the watermark by modulating the watermark with a pseudo-noise sequence and then (2) combining the spread watermark with the audio signal. Detection of such a watermark involves correlating the audio signal (after being watermarked) with the pseudo-noise sequence, which de-spreads the watermark, thereby permitting the watermark to be detected after the correlation.

Accordingly, the example watermark detector 310 of FIG. 5 includes an example correlator 505 to correlate magnetic field data, such as magnitude values determined by the magnitude field estimator 305 and representative of a magnitude of a magnetic field over time, with a reference sequence, such as a pseudo-noise sequence, to determine second (e.g., de-spread) magnetic field data. The example watermark detector 310 of FIG. 5 also includes an example watermark decoder 510 to process the second (e.g., de-spread) magnetic field data determined by the correlator 505 to detect the watermark. For example, the watermark decoder 510 may use any appropriate data decoding technique, such as matched filter decoding, maximum likelihood decoding, etc., to detect the watermark in the second (e.g., de-spread) magnetic field data determined by the correlator 505.

While example manners of implementing the media monitoring system 100 are illustrated in FIGS. 1-5, one or more of the elements, processes and/or devices illustrated in FIGS. 1-5 may be combined, divided, re-arranged, omitted, eliminated and/or implemented in any other way. Further, the example media device meter 125, the example network 135, the example data processing facility 140, the example magnetometer 145, the example media device monitor 150, the example magnetic field estimator 305, the example watermark detector 310, the example frequency transformer 405, the example watermark decoder 410, the example alias compensator 415, the example correlator 505, the example watermark decoder 510 and/or, more generally, the example media monitoring system 100 of FIGS. 1-5 may be implemented by hardware, software, firmware and/or any combination of hardware, software and/or firmware. Thus, for example, any of the example media device meter 125, the example network 135, the example data processing facility 140, the example magnetometer 145, the example media device monitor 150, the example magnetic field estimator 305, the example watermark detector 310, the example frequency transformer 405, the example watermark decoder 410, the example alias compensator 415, the example correlator 505, the example watermark decoder 510 and/or, more generally, the example media monitoring system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media monitoring system 100, the example media device meter 125, the example network 135, the example data processing facility 140, the example magnetometer 145, the example media device monitor 150, the example magnetic field estimator 305, the example watermark detector 310, the example frequency transformer 405, the example watermark decoder 410, the example alias compensator 415, the example correlator 505 and/or the example watermark decoder 510 is/are hereby expressly defined to include a tangible computer readable storage device or storage disk such as a memory, a digital versatile disk (DVD), a compact disk (CD), a Blu-ray disk, etc. storing the software and/or firmware. Further still, the example media monitoring system 100 of FIGS. 1-5 may include one or more elements, processes and/or devices in addition to, or instead of, those illustrated in FIG. 4, and/or may include more than one of any or all of the illustrated elements, processes and devices.

Figure 6:
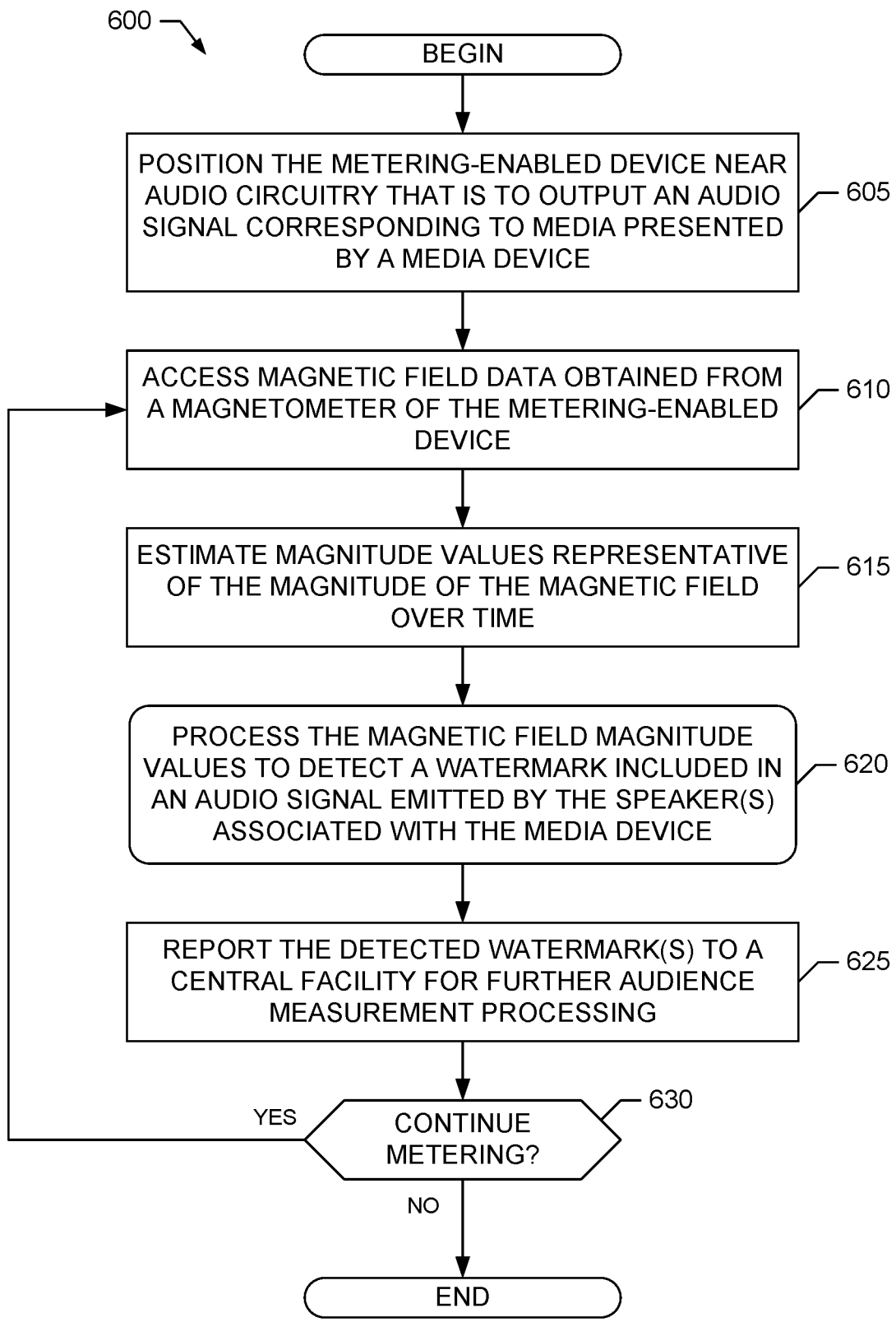
FIG. 6 is a flowchart representative of example machine readable instructions that may be executed to implement the example media device monitor of FIGS. 1, 2 and/or 3.
Figure 7:
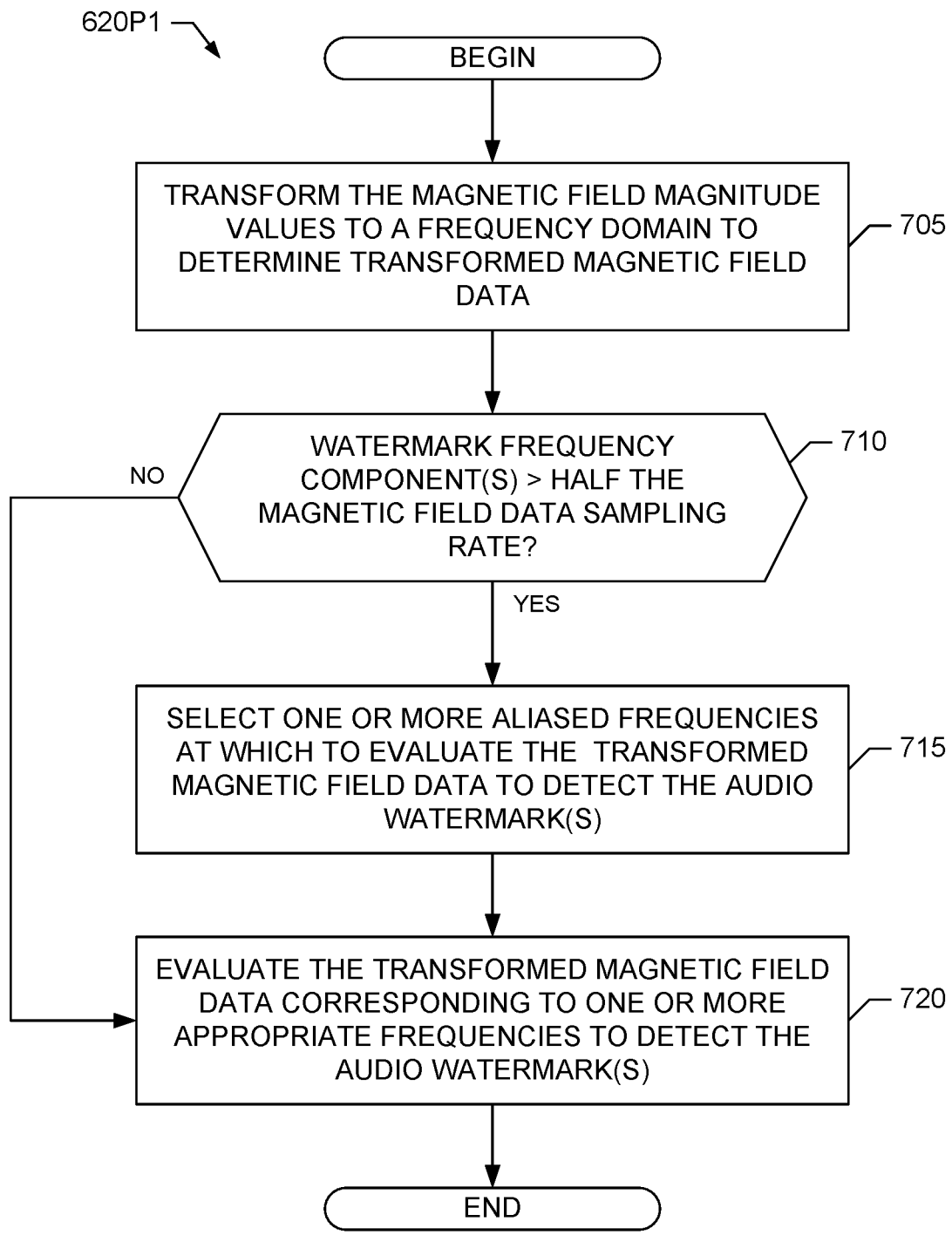
FIG. 7 a flowchart representative of example machine readable instructions that may be used to implement at least a portion of the example machine readable instructions of FIG. 6 and/or that may be executed to implement the first example watermark detector of FIG. 4.
Figure 8:
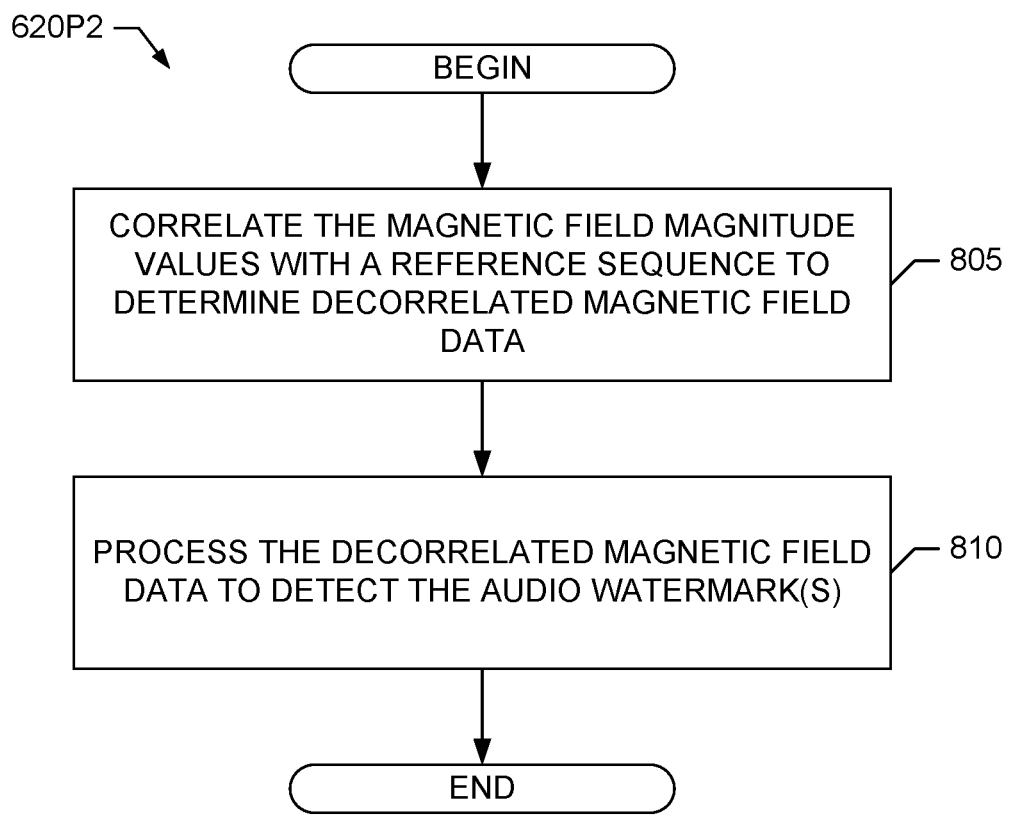
FIG. 8 a flowchart representative of example machine readable instructions that may be used to implement at least a portion of the example machine readable instructions of FIG. 6 and/or that may be executed to implement the second example watermark detector of FIG. 5.

Flowcharts representative of example machine readable instructions for implementing the example media monitoring system 100, the example media device meter 125, the example network 135, the example data processing facility 140, the example magnetometer 145, the example media device monitor 150, the example magnetic field estimator 305, the example watermark detector 310, the example frequency transformer 405, the example watermark decoder 410, the example alias compensator 415, the example correlator 505 and/or the example watermark decoder 510 are shown in FIGS. 6-8. In these examples, the machine readable instructions comprise one or more programs for execution by a processor, such as the processor 1112 shown in the example processor platform 1100 discussed below in connection with FIG. 11. The one or more programs, or portion(s) thereof, may be embodied in software stored on a tangible computer readable storage medium such as a CD-ROM, a floppy disk, a hard drive, a digital versatile disk (DVD), a Blu-ray Disc™, or a memory associated with the processor 1112, but the entire program or programs and/or portions thereof could alternatively be executed by a device other than the processor 1112 and/or embodied in firmware or dedicated hardware (e.g., implemented by an ASIC, a PLD, an FPLD, discrete logic, etc.). Also, one or more of the machine readable instructions represented by the flowcharts of FIGS. 6-8 may be implemented manually. Further, although the example program(s) is(are) described with reference to the flowcharts illustrated in FIGS. 6-8, many other methods of implementing the example media monitoring system 100, the example media device meter 125, the example network 135, the example data processing facility 140, the example magnetometer 145, the example media device monitor 150, the example magnetic field estimator 305, the example watermark detector 310, the example frequency transformer 405, the example watermark decoder 410, the example alias compensator 415, the example correlator 505 and/or the example watermark decoder 510 may alternatively be used. For example, with reference to the flowcharts illustrated in FIGS. 6-8, the order of execution of the blocks may be changed, and/or some of the blocks described may be changed, eliminated, combined and/or subdivided into multiple blocks.

As mentioned above, the example processes of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-8 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 600 that may be executed to implement the media device meter 125 of FIGS. 1-5 is represented by the flowchart shown in FIG. 6. With reference to the preceding figures and associated written descriptions, the example program 600 of FIG. 6 begins execution at block 605 at which the media device meter 125 (e.g., which may be a portable device 125) is positioned within a first distance of the audio circuitry that is to output an audio signal corresponding to media being presented by the media device 110. For example, and as described above, the media device meter 125 may be positioned within a first distance (e.g., adjacent to or within a few inches, feet or some other distance) of the media device 110 if the speaker(s) 155 are included in the media device 110, or within the first distance of the speaker(s) 155, but farther away from the media device 110, if the speaker(s) 155 are separate from the media device 110 (e.g., as in the case of wireless speakers).

At block 610, the magnetic field estimator 305 of the media device meter 125 (e.g., which is included in the media device monitor 150 of the media device meter 125) accesses magnetic field data obtained from the magnetometer 145 of the media device meter 125, as described above. At block 615, the magnetic field estimator 305 processes the magnetic field data obtained at block 610 to estimate magnitude values of the magnetic field value (e.g., using Equation 3 or 4), as described above. At block 620, the watermark detector 310 of the media device meter 125 (e.g., which is included in the media device monitor 150 of the media device meter 125) processes the magnetic field magnitude values determined at block 615 to detect a watermark that was induced in the magnetic field data by the audio signal provided to the speaker(s) 155 of the media device 110, as described above. Example machine readable instructions that may be used to implement the processing at block 620 are illustrated in FIGS. 7 and 8, which are described in further detail below.

At block 625, the media device monitor 150 of the media device meter 125 stores the detected watermark data and reports the detected watermark data to the data processing facility 140 for further processing. If watermark detection processing is to continue (block 630), processing returns to block 610 and blocks subsequent thereto to permit the media device meter 125 to continue detecting watermarks using magnetic field data. Otherwise, execution of the example program 600 ends.

An example program 620P1 that may be executed to implement the example watermark detector 310 of FIGS. 3 and/or 4, and/or that may be used to implement the processing at block 620 of FIG. 6, is represented by the flowchart shown in FIG. 7. With reference to the preceding figures and associated written descriptions, the example program 620P1 of FIG. 7 begins execution at block 705 at which the frequency transformer 405 of the watermark detector 310 transforms magnetic field magnitude values (e.g., obtained from the magnitude field estimator 305) to a frequency domain to determine transformed magnetic field data, as described above. At block 710, the alias compensator 415 of the watermark detector 310 determines whether frequency component(s) of the watermark(s) to be detected are located at frequencies greater than half the sampling rate at which the magnetic field data is accessed (e.g., by the magnitude field estimator 305). If the frequency component(s) of the watermark(s) are greater than half the magnetic field data sampling rate (block 710), processing proceeds to block 715 at which the alias compensator 415 selects one or more aliased frequencies at which the watermark decoder 410 of the watermark detector 310 is to evaluate the transformed magnetic field data to detect the watermark(s), as described above. After processing at block 715 completes, or if the frequency component(s) of the watermark(s) are not greater than half the magnetic field data sampling rate (block 710), processing proceeds to block 720 at which the watermark detector 310 evaluates the transformed magnetic field data to detect the watermark(s), as described above. For example, at block 720 the watermark detector 310 evaluates the transformed magnetic field data at the original frequency or frequencies of the watermark(s) if the original frequency component(s) of the watermark(s) are not greater than half the magnetic field data sampling rate, and/or evaluates the transformed magnetic field data at the aliased frequency or frequencies of the watermark(s) if the original frequency component(s) of the watermark(s) are greater than half the magnetic field data sampling rate. Execution of the example program 620P1 then ends.

An example program 620P2 that may be executed to implement the example watermark detector 310 of FIGS. 3 and/or 5, and/or that may be used to implement the processing at block 620 of FIG. 6, is represented by the flowchart shown in FIG. 8. With reference to the preceding figures and associated written descriptions, the example program 620P2 of FIG. 8 begins execution at block 805 at which the correlator 505 of the watermark detector 310 correlates magnetic field data, such as magnitude values determined by the magnitude field estimator 305 and representative of a magnitude of a magnetic field over time, with a reference sequence, such as a pseudo-noise sequence, to determine second (e.g., de-spread) magnetic field data, as described above. At block 810, the watermark decoder 510 of the watermark detector 310 processes the second (e.g., de-spread) magnetic field data determined at block 805 to detect the watermark(s), as described above. Execution of the example program 620P2 then ends.

Figure 9:
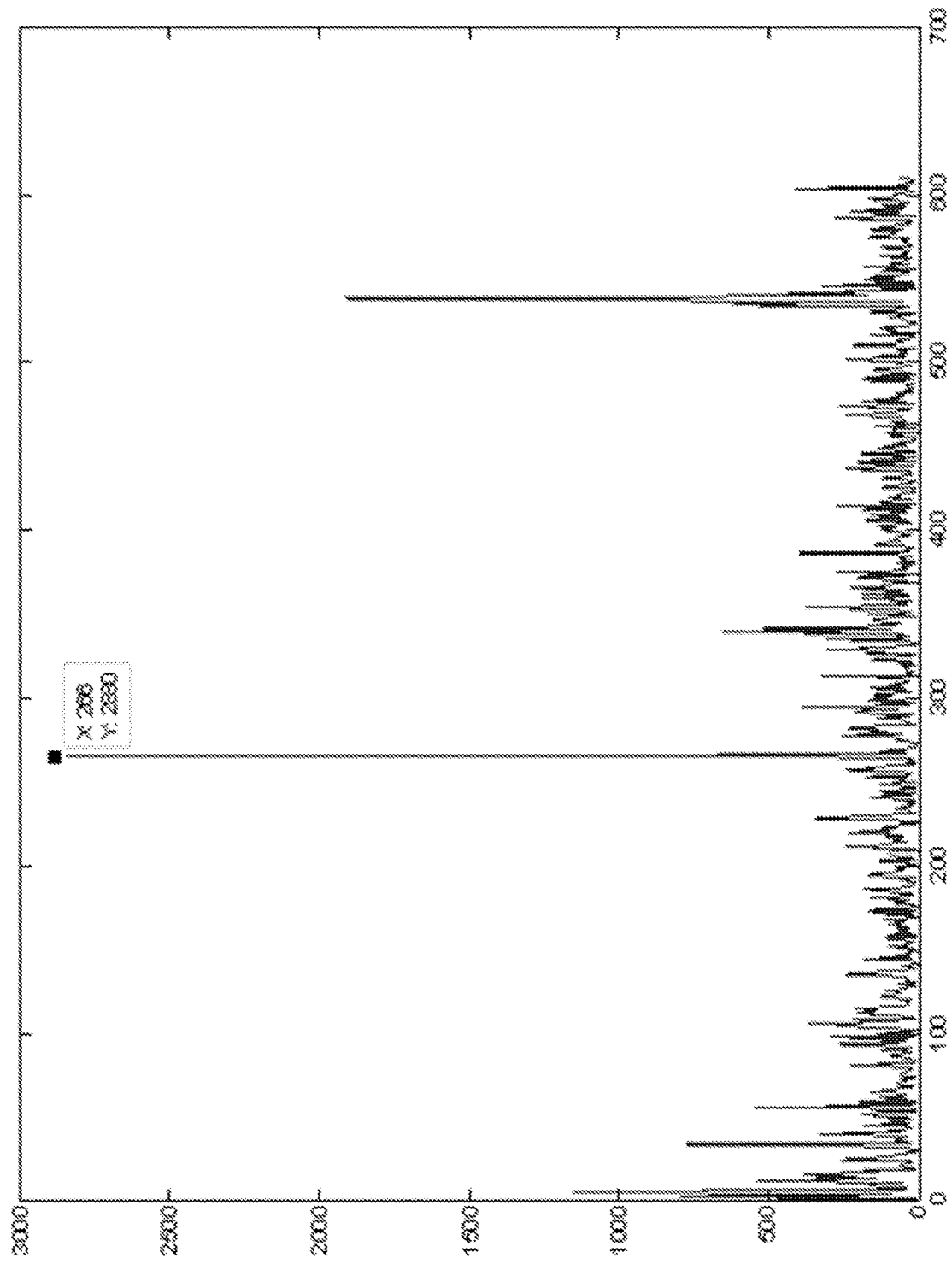
FIGS. 9-10 illustrated example operational results for the example media device monitor of FIGS. 1, 2 and/or 3.
Figure 10:
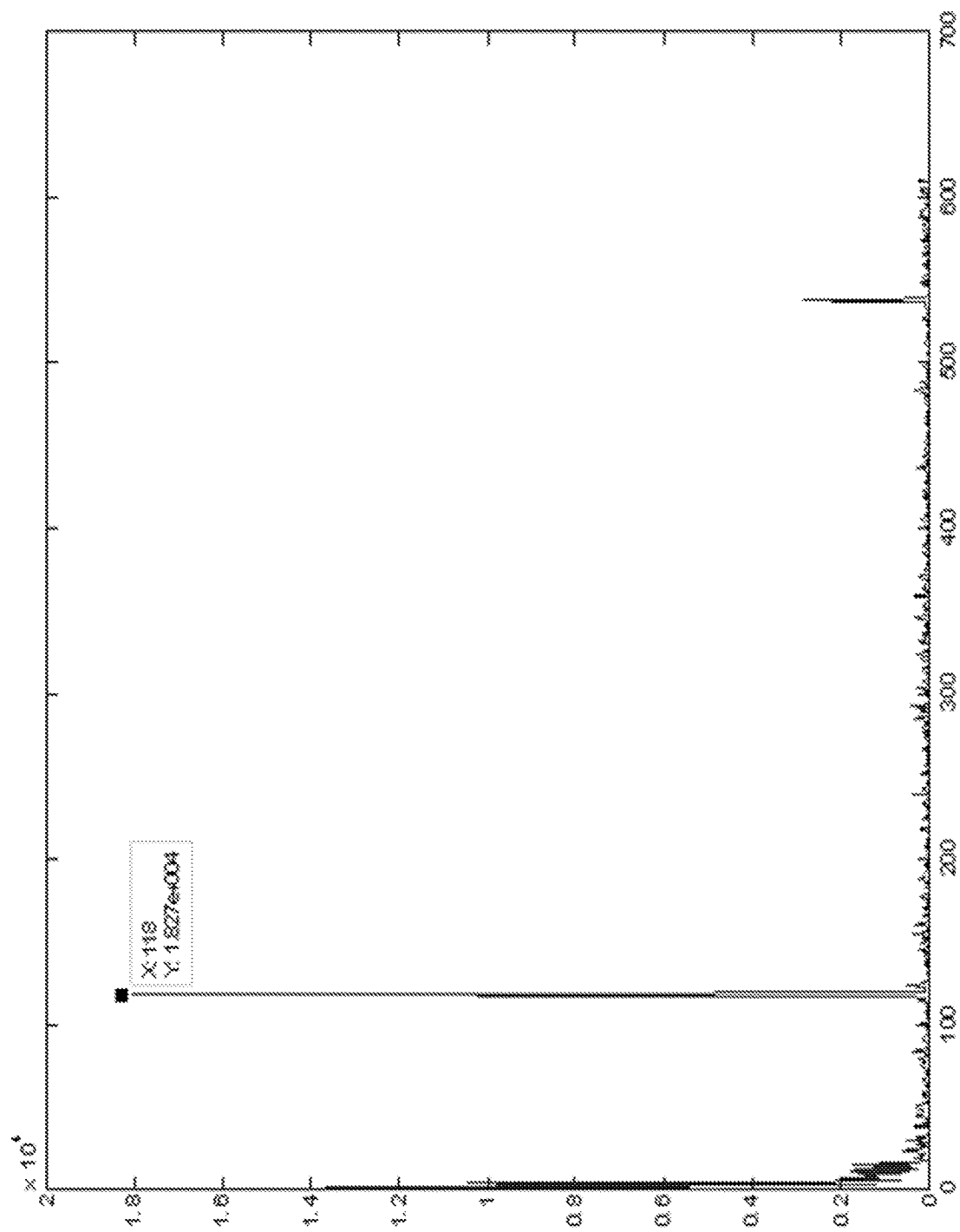

FIGS. 9-10 illustrate example operational results that can be achieved by the example media device monitor 150 of FIGS. 1-3 when detecting a watermark in magnetic field data. In the illustrated examples of FIGS. 9-10, a watermark is embedded as a single frequency tone in the audio signal. In the example of FIG. 9, the watermark is embedded as a 32 Hz tone, whereas in the example of FIG. 10, the watermark is embedded as a 45 Hz tone. In the illustrated examples, the sampling frequency for obtaining the magnetic field data the magnetic field data is 41 Hz, and the media device monitor 150 processes 1230 magnetic field magnitude values determined over a 30 second period to detect watermark. The graphs in FIGS. 9 and 10 depict example results for detecting the respective watermarks embedded at the respective frequencies of 32 Hz and 45 Hz. In FIGS. 9 and 10, the x-axis corresponds to a frequency index, which can be converted to an actual frequency by multiplying the frequency index by the sampling frequency (41 Hz) and dividing by the total number of samples (1230) being processed. In the example of FIG. 9, it can be seen that the media device monitor 150 is able to detect the watermark embedded at 32 Hz as a peak at approximately 9 Hz due to aliasing (i.e., the peak at frequency index 266 corresponds to a peak at 266×41/1230=8.9 Hz). Similarly, in the example of FIG. 10, it can be seen that the media device monitor 150 is able to detect the watermark embedded at 45 Hz as a peak at approximately 4 Hz due to aliasing (i.e., the peak at frequency index 118 corresponds to a peak at 118×41/1230=3.7 Hz).

Figure 11:
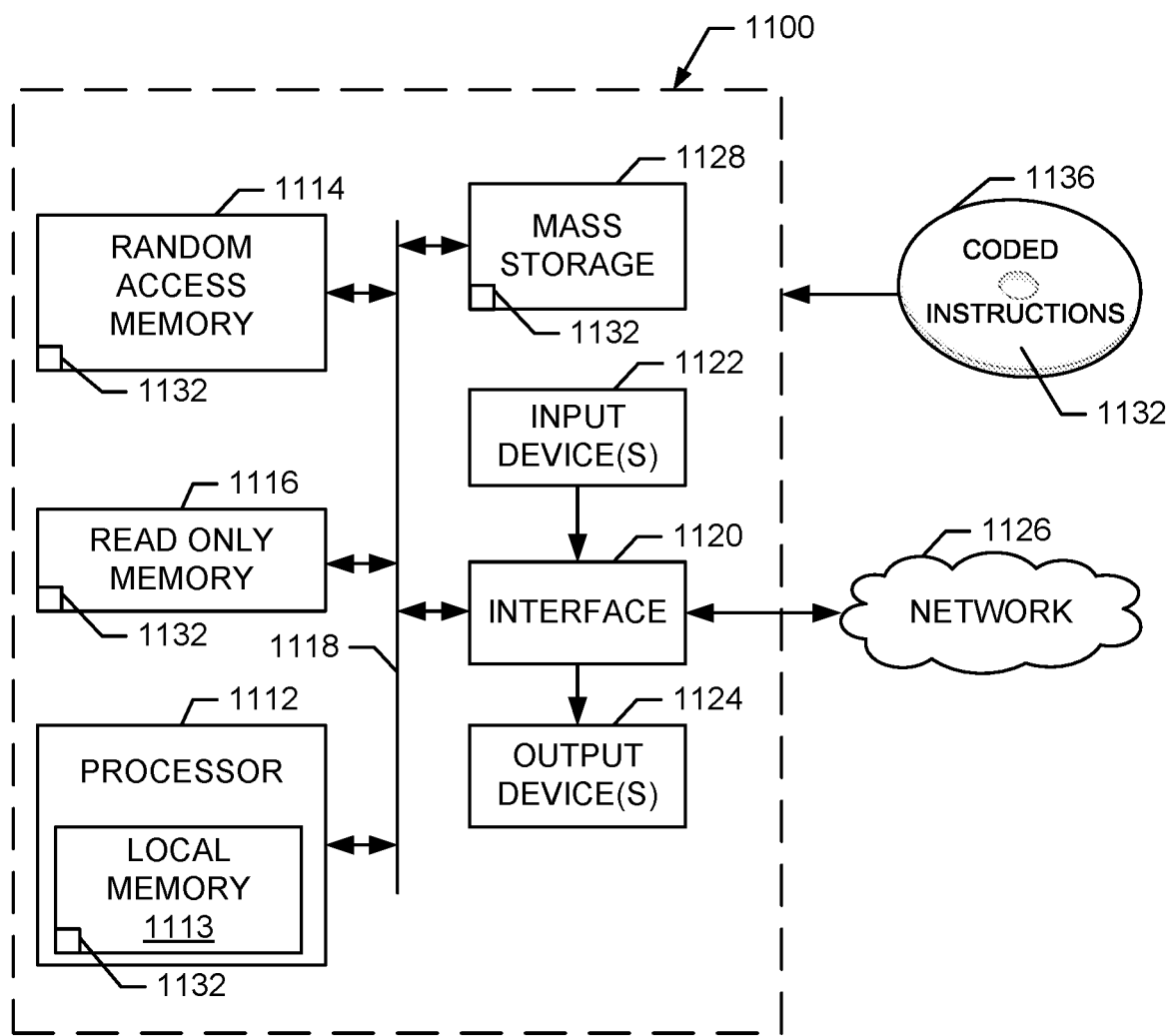
FIG. 11 is a block diagram of an example processor platform that may execute the example machine readable instructions of FIGS. 6, 7 and/or 8 to implement the example media device monitor of FIGS. 1, 2 and/or 3, the first example watermark detector of FIG. 4, the second example watermark detector of FIG. 5, and/or the example portable device of FIGS. 1 and/or 2.

FIG. 11 is a block diagram of an example processor platform 1100 capable of executing the instructions of FIGS. 6-8 to implement the example media monitoring system 100, the example media device meter 125, the example network 135, the example data processing facility 140, the example magnetometer 145, the example media device monitor 150, the example magnetic field estimator 305, the example watermark detector 310, the example frequency transformer 405, the example watermark decoder 410, the example alias compensator 415, the example correlator 505 and/or the example watermark decoder 510 of FIGS. 1-5. The processor platform 1100 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache) (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID (redundant array of independent disks) systems, and digital versatile disk (DVD) drives.

Coded instructions 1132 corresponding to the instructions of FIGS. 6-8 may be stored in the mass storage device 1128, in the volatile memory 1114, in the non-volatile memory 1116, in the local memory 1113 and/or on a removable tangible computer readable storage medium, such as a CD or DVD 1136.

From the foregoing, it will be appreciated that methods, apparatus, systems and articles of manufacture (e.g., physical storage media) to detect media watermarks in magnetic field data have been disclosed. Practical applications of watermark detection using magnetic field data, as disclosed herein, include, but are not limited to, content recognition, source detection, security applications, etc. For example, content recognition can performed using a portable device as disclosed herein and positioned near the speakers of a media device. In the case of source detection, the media device (e.g., a set top box, DVD player, game console, etc.) can add a low-frequency watermark to the audio signal on-the-fly, which can be detected as disclosed herein and used to identify the source of the media being presented. In some security applications, the watermarks can provide a secure channel of communication that can be used to perform user authentication, device authentication, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a magnetometer to detect a magnetic field induced by circuitry of a speaker, the speaker to communicate wirelessly with a media device;
machine readable instructions; and
programmable circuitry to execute the machine readable instructions to at least:
transform multidimensional magnetic field data from the magnetometer to determine transformed magnetic field data, the multidimensional magnetic field data associated with a sampling rate; and
process a portion of the transformed magnetic field data associated with a first frequency to detect an audio watermark encoded in an audio signal to be output from the speaker, the audio watermark to have a frequency component associated with a second frequency different from the first frequency, the first frequency to be aliased relative to the second frequency based on the sampling rate.

2. The apparatus of claim 1, wherein the sampling rate is less than twice the second frequency.

3. The apparatus of claim 1, wherein the first frequency is based on a difference between the sampling rate and the second frequency.

4. The apparatus of claim 3, wherein the programmable circuitry is to select the first frequency based on a difference between the sampling rate and the second frequency.

5. The apparatus of claim 1, wherein the programmable circuitry is to cause an output to be asserted when the audio watermark is detected.

6. The apparatus of claim 5, further including a display, wherein the output is at least one of a light, a tone or a symbol to be displayed on the display.

7. The apparatus of claim 1, wherein the audio watermark is included in a first frequency range of the audio signal that is below a second frequency range of the speaker, the first frequency range including the second frequency.

8. The apparatus of claim 1, wherein to transform the multidimensional magnetic field data, the programmable circuitry is to:
process a plurality of directional components included in the multidimensional magnetic field data to determine magnitude values representative of a magnitude of the multidimensional magnetic field data over time; and
perform at least one of a fast Fourier transform, a discrete Fourier transform, a discrete cosine transform of a Hadamard transform on the magnitude values to determine the transformed magnetic field data.

9. The apparatus of claim 1, wherein the apparatus is structured to be positioned adjacent to the speaker.

10. The apparatus of claim 1, wherein the audio signal is to correspond to media presented by the media device.

11. An apparatus comprising:
a magnetometer to detect a magnetic field induced by circuitry of a speaker, the speaker to communicate wirelessly with a media device;
machine readable instructions; and
programmable circuitry to execute the machine readable instructions to at least:
process multidimensional magnetic field data from the magnetometer to determine first magnetic field data representative of a magnitude of the multidimensional magnetic field data over a time domain;
correlate, over the time domain, the first magnitude field data with a reference sequence to determine second magnetic field data; and
process the second magnetic field data to detect an audio watermark encoded in an audio signal to be output from the speaker.

12. The apparatus of claim 11, wherein the reference sequence is a pseudo-noise sequence.

13. The apparatus of claim 12, wherein the audio signal is a first audio signal, and the audio watermark is encoded in the first audio signal by:
modulating the audio watermark with the pseudo-noise sequence to determine a modulated audio watermark; and
combining the modulated audio watermark with a second audio signal to produce the first audio signal.

14. The apparatus of claim 11, wherein the programmable circuitry is to process the second magnetic field data with a matched filter to detect the audio watermark.

15. The apparatus of claim 11, wherein the programmable circuitry is to cause an output to be asserted when the audio watermark is detected.

16. The apparatus of claim 15, further including a display, wherein the output is at least one of a light, a tone or a symbol to be displayed on the display.

17. The apparatus of claim 11, wherein the audio watermark is included in a first frequency range of the audio signal that is below a second frequency range of the speaker.

18. The apparatus of claim 11, wherein the multidimensional magnetic field data includes a plurality of directional components.

19. The apparatus of claim 11, wherein the apparatus is structured to be positioned adjacent to the speaker.

20. The apparatus of claim 11, wherein the audio signal is to correspond to media presented by the media device.

* * * * *